United States Patent [19]

Albertson et al.

[11] 4,162,660
[45] Jul. 31, 1979

[54] DIRTY AIR FILTER INDICATOR

[76] Inventors: Robert V. Albertson, 2100 Shadywood Rd., Wayzata, Minn. 55391; Edward P. Christian, Lees Island, N. Twin Lake, Crystal, Minn. 55429

[21] Appl. No.: 920,179

[22] Filed: Jun. 29, 1978

[51] Int. Cl.² .............. B01D 35/00; G01L 19/12
[52] U.S. Cl. .................................. 116/268; 55/274; 55/DIG. 34; 116/DIG. 25
[58] Field of Search .............. 116/114 AE, 114 PV, 116/DIG. 25; 73/118, 38; 55/274, DIG. 34

[56] References Cited

U.S. PATENT DOCUMENTS

| 1,863,456 | 6/1932 | Smith | 116/DIG. 25 |
|---|---|---|---|
| 2,655,894 | 10/1953 | Rabbitt | 55/274 X |
| 2,706,463 | 4/1955 | Dunn | 116/114 PV |
| 3,068,831 | 12/1962 | Witchell | 116/114 PV |
| 3,143,997 | 8/1964 | Norberg et al. | 116/114 |
| 3,172,746 | 3/1965 | Shuck | 116/114 PV X |
| 3,312,187 | 4/1967 | McKinlay | 116/DIG. 25 |
| 3,381,651 | 5/1968 | McKinlay | 116/70 |
| 3,736,900 | 6/1973 | Nowicki | 116/DIG. 25 |
| 3,914,995 | 10/1975 | Yoshida | 73/118 |
| 3,977,253 | 8/1976 | Lewis | 73/38 X |
| 4,020,783 | 5/1977 | Anderson et al. | 116/114 PV |
| 4,029,041 | 6/1977 | Genshpring et al. | 116/114 AE |

Primary Examiner—Daniel M. Yasich
Attorney, Agent, or Firm—Kinney, Lange, Westman & Fairbairn

[57] ABSTRACT

A dirty filter indicator for use with an air filter for an internal combustion engine, the filter comprising a replacement for an ordinary wingnut used to hold the outer cover of the air cleaner in position. The replacement nut has a bypass passage through it which communicates with the interior of the filter so that if the filter becomes dirty and clogged, a lightweight ball which is located in this passage and is normally biased to one position moves to a second position to indicate that the filter is dirty.

3 Claims, 3 Drawing Figures

U.S. Patent    Jul. 31, 1979    4,162,660
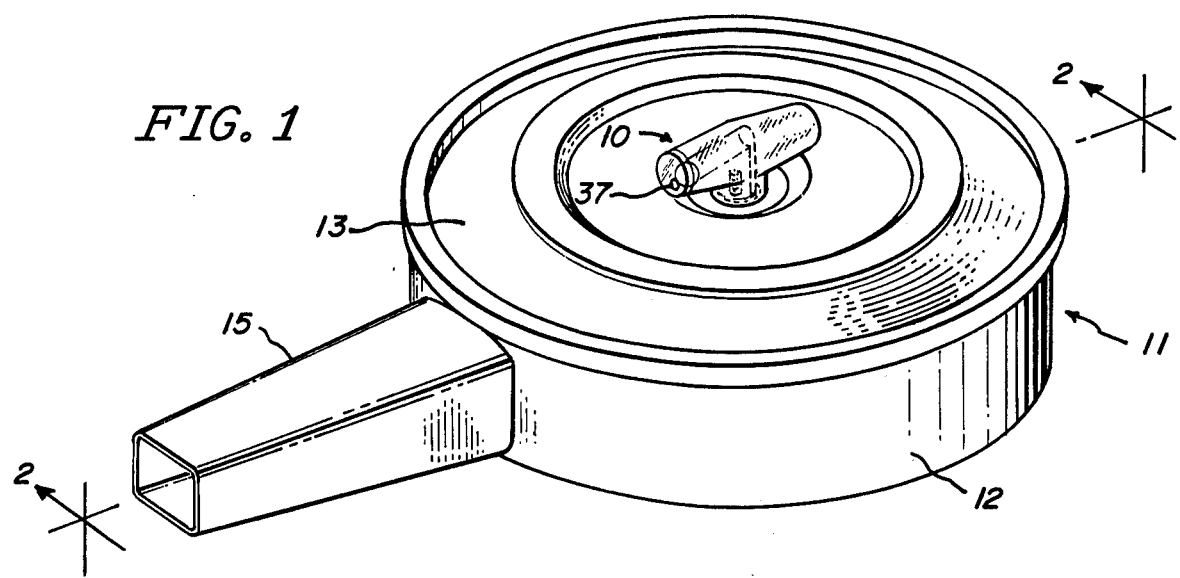
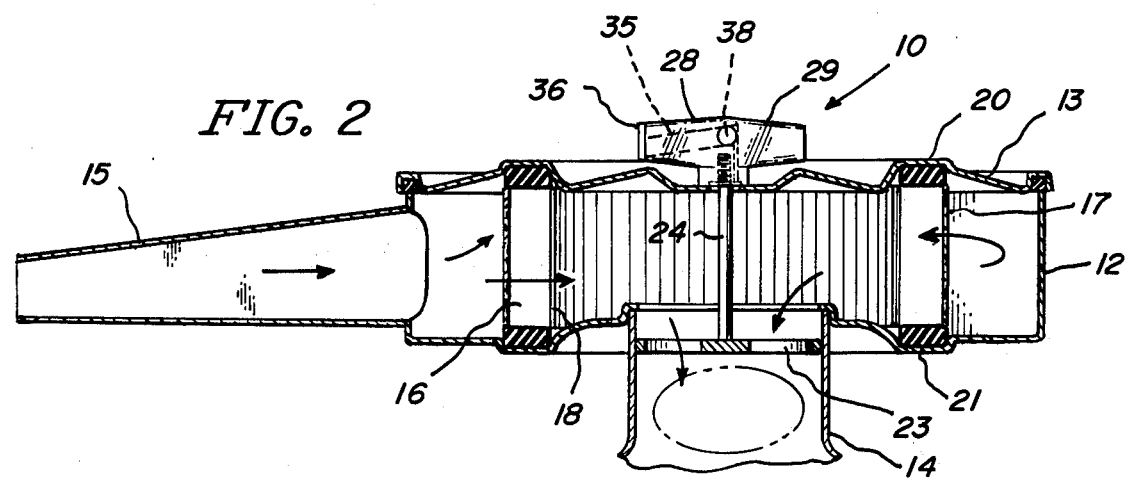
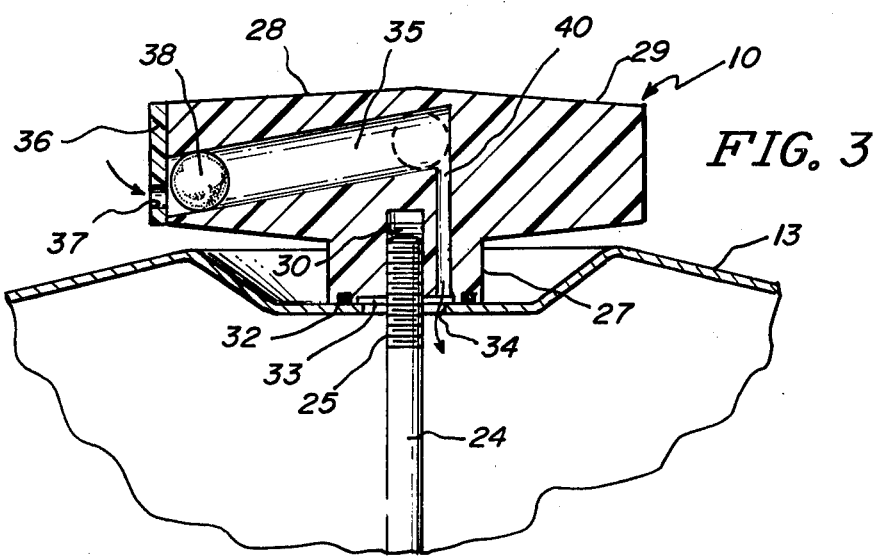

DIRTY AIR FILTER INDICATOR

BACKGROUND OF THE INVENTION

It is very important in connection with internal combustion engines to be able to determine when the filter in the air cleaner needs replacing. In connection with automotive vehicles, this is often done in a gasoline service station by removing the cover and holding a light on one side of the filter element to see the extent to which the light is visible on the other side. This method is not only inaccurate, but also involves removing the cover to the air cleaner. Consequently, this check is often neglected. There is very little question but what a dirty filter in an air cleaner of an internal combustion engine greatly increases the amount of pollutants which are discharged into the atmosphere and decreases the efficiency of the engine.

Various arrangements have been proposed for checking the condition of automobile filters. One such arrangement, shown in the McKinlay U.S. Pat. No. 3,317,187 and U.S. Pat. No. 3,381,651, is that of providing a differential air pressure responsive device built into the cover of an air cleaner. This, however, involves either a very substantial modification of the air cleaner cover or the provision of a special cover.

Another arrangement which has been proposed is that shown in the Anderson et al U.S. Pat. No. 4,020,783. In this case, a wingnut incorporating a differential pressure responsive device is employed to hold in place and detect whether an inner safety filter is dirty or not. To determine, however, whether this inner filter is dirty or not requires that three covers be removed. The suggestion is made in a later portion of the specification that the special wingnut can also be employed to replace the wingnut holding the outer filter in position. There is still no concept, however, of having an indicator visible from outside the air cleaner. Furthermore, the special nut of the Anderson et al patent would not be adaptable to hold the outer cover of a conventional air cleaner in position.

SUMMARY OF THE PRESENT INVENTION

The present invention is concerned with an arrangement for indicating a dirty filter, which arrangement can be quickly applied by anyone and is visible at all times from outside the air cleaner. Briefly, the invention involves providing a dirty filter indicator which is built into a replacement nut designed to replace the nut which normally holds the outer cover on the air cleaner. Thus, all that it is necessary to do to install the dirty filter indicator is to unscrew the regular wingnut that is normally employed to hold the air cleaner cover in position and to replace it with the dirty filter indicator of the present invention. This can be done by one possessing a minimum of mechanical skill.

Specifically, the dirty filter indicator of the present invention involves a replacement nut which can be used with a conventional outer cover of an air cleaner and which has a restricted passage therethrough which communicates at its outer end with the atmosphere and at its inner end with the downstream side of the filter member and which has in the passage a differential pressure responsive device which is normally in one position but is moved to a second position when the filter is dirty.

In one specific form of the invention, the passage is an inclined passage and the differential air responsive device is a light ball located in said inclined passage and normally disposed at the lower end thereof, but movable toward the opposite upper end thereof when the differential pressure exceedw a predetermined value. This ball is preferably a relatively light ball so that a relatively small differential pressure is capable of moving it from its normal position to the position in which it indicates the existence of a dirty filter.

The material of which the replacement nut is formed is preferably at least partly transparent so that the position of the pressure responsive device can be visible from outside the nut, thus enabling one to quickly determine by a mere visual observation whether the filter is dirty or not.

Other objects and advantages of the invention will be apparent from the accompanying specification, claims and brief description of the drawing.

FIG. 1 is a perspective view of an air cleaner with the dirty filter detector of the present invention secured thereto;

FIG. 2 is a sectional view with the section taken along the line 2—2 of FIG. 1; and FIG. 3 is a fragmentary sectional view showing the dirty filter indicator in section on a larger scale than in FIGS. 1 and 2.

DESCRIPTION OF THE PREFERRED EMBODIMENT

Referring to the drawing, the improved dirty filter detector of the present invention is shown in connection with an air cleaner of conventional construction, the dirty filter being indicated in its entirety by the numeral 10 and the air cleaner by the numeral 11. The air cleaner is of a conventional type having a shell or housing 12 and a removable outer cover 13. The air cleaner is secured to carburetor intake 14 and is provided with an air scoop 15 through which air enters the air cleaner. Disposed within the air cleaner is a conventional filter 16 which may, for example, be formed of porous impregnated paper which is corrugated to form an annular member having an outer annular wall 17 through which air enters and an inner annular wall 18 through which air is discharged before entering the carburetor intake 14. Arrows are placed in the air scoop 15, adjacent the filter 16 and adjacent the carburetor intake tube 14 to show the direction of flow. The cover 13 and the bottom of the shell or housing 12 are formed to provide annular recesses to accommodate the filter 16 and to hold it snugly in place when the cover 13 is clamped down against the housing 12. The construction described so far is entirely conventional and is merely described to show one particular type of arrangement in which the present invention is usable.

As is also conventionally provided, a perforated plate or spider 23 is secured inside the carburetor intake tube 14. This plate has secured thereto an upstanding rod 24 which is threaded at its upper end 25 as best shown in FIG. 3. Normally, a wingnut secured to the threaded portion 25 holds the outer cover clamped in airtight relationship against the shell or housing 12 and also holds the air cleaner snugly aginst the carburetor intake tube 14. Suitable gaskets are provided to insure an airtight seal between the cover and the shell 12, between the filter 16 and the cover and bottom of the air cleaner, and between the air cleaner and the carburetor intake tube 14.

As indicated above, the present dirty filter indicator is in the form of a replacement nut which is substituted for the conventional wingnut.

Referring to FIG. 3 specifically, wherein the filter indicator 10 is shown in section, it will be noted that this is comprised of a central portion 27 and two arms 28 and 29. The arms 28 and 29 may be of circular cross-section. The central portion 27 has an interior upwardly extending threaded portion 30 which is designed to mesh with the threads 25 at the upper end of rod 24. If desired, a metal insert may be molded into the member 10 to add strength to the threads of the threaded passage 30. On the underface of the central portion 27 which is shaped to to engage the outer surface of the cover 13, a groove is provided in which a gasket 32 is disposed. This gasket may be in the form of an O-ring. Obviously, when the indicator 10 is clamped down to clamp the outer cover 13 against the housing 12 and to clamp the air cleaner in position, the gasket 32 aids in forming an airtight seal between the bottom of the central portion of the indicator 10 and the upper portion of cover 13.

Also disposed in the underside of the central portion 27 is a recessed portion 33 of generally circular cross-sectional area. This recessed portion has a diameter sufficiently large to overlie the bolt hole 34 in the upper cover 13. This bolt hole 34 is of a diameter substantially greater than the diameter of the bolt 24 to facilitate placing the air cleaner in position. If the hole 34 were of almost exactly the same diameter as the threaded rod 24, it would be very difficult to fit the air cleaner over the end of the bolt 24.

Disposed in the arm 28 is an inclined passage 35 which is partially closed at its outer end by a plate 36 having an aperture 37 therethrough, the diameter of the aperture being substantially less than the diameter of the passage 35. A light porous ball 38 of suitable foamed plastic is disposed within the passage 35 and is prevented from passing through the outer end by the plate 36 which may be secured to the arm 28 in any suitable manner, after the ball 38 has been inserted into the passage 35. The inclined passage 35 communicates at its inner end with a downwardly extending vertical passage 40 which in turn communicates with the recessed portion 33 which, as previously pointed out, overlies the hole 34. It will thus be apparent, as indicated by arrows adjacent the opening 37 and the opening 34, that air tends to enter the aperture 37, pass through passage 35, the downwardly extending passage 40 and the opening 34. While the ball 38 tends to prevent the flow of air in this manner, a differential pressure exists across ball 38. The restriction to the passage of air in this manner is much greater than that through the filter when the filter is relatively clean. This is due to the restricted nature of the passage as compared with the very large area of the filter through which air may pass. When, however, the filter becomes dirty, the differential pressure across opposite sides of ball 38 increases, tending to cause the ball to move up the inclined passage 35 towards the position shown in dotted lines in FIG. 3 and towards the position shown in FIG. 2. Since the ball 38 is of foamed plastic material, its weight is very slight and a relatively small differential pressure is all that is required to shift the ball from the solid to the dotted line position of FIG. 3.

It will thus be clearly apparent that when the dirty filter indicator of the present invention is used instead of the conventional wingnut, the indicator 10 will provide a quick, readily visible means of determining whether the filter 16 needs replacing. If the ball 38 is in the position shown in solid lines in FIG. 3, the filter 16 is satisfactory. When, however, it becomes dirty so that the flow of air through the filter element is impeded, the ball 38 will move to the position shown in dotted lines. Because the material of the replacement nut is transparent, the position of ball 38 is at all times visible. With this arrangement, it is unnecessary to remove even the air cleaner outer cover 13 in order to observe the condition of the filter. Furthermore, unlike dirty filter detectors installed in the cover 13, the installation of the present dirty filter detector can be made very readily by the simple process of unscreing the conventional wingnut and replacing it with the substitute nut of the present invention.

While we have shown a specific embodiment of our invention, it is to be understood that this is for purposes of illustration only and that the scope of the invention is limited solely by that of the appended claims.

We claim:

1. A dirty filter indicator device for use with an air cleaner for an internal combustion engine in which there is a housing secured to the vehicle, said housing having inlet and outlet openings, an annular filter element in said housing with the inner and outer annular walls of said filter element being in communication respectively with said inlet and outlet openings, a detachable outer cover secured to said housing, and a threaded rod projecting from said housing through an opening in said cover of greater cross-sectional area than that of said rod, said threaded rod being designed to have a nut secured thereto for clamping said outer cover in position against said housing:

said indicator device comprising a central portion having a threaded opening therein for threaded engagement with the threaded rod of the cleaner and having a base designed to engage in fluid tight relationship the outer wall of the detachable cover of the cleaner and having a recess in said base of larger cross-sectional area than the opening through the detachable cover and designed to overlie said opening, said indicator device having two laterally extending arms projecting from said central portion to provide means for readily tightening said indicator device on said threaded rod against said cover, said indicator device further having an inclined passage extending through at least part of one of said arms and said central portion, said passage communicating at its outer end with the atmosphere and at its inner end with said recess and being inclined downwardly from adjacent said central portion to the outer end thereof, and said indicator device having a ball disposed in said inclined passage, said ball normally resting in the outer lower portion of said passage but movable upwardly towards said central portion when the differential pressure thereacross increases as a result of the filter becoming dirty, at least a portion of the laterally extending arm in which said passage is located being transparent so that the position of the ball can be observed.

2. The dirty filter indicator of claim 1 in which said central portion and said arms of said indicator device are formed of a transparent plastic so that said ball is visible from the exterior of said indicating device.

3. The dirty filter indicator of claim 1 in which a vertical passage extends upwardly from said recess in said central portion to the inner end of said inclined passage.

* * * * *